United States Patent
Plihal et al.

(10) Patent No.: US 8,948,494 B2
(45) Date of Patent: Feb. 3, 2015

(54) UNBIASED WAFER DEFECT SAMPLES

(71) Applicant: KLA-Tencor Corporation, Milpitas, CA (US)

(72) Inventors: Martin Plihal, Pleasanton, CA (US); Vidyasagar Anantha, Hyderabad (IN); Saravanan Paramasivam, Chennai (IN); Chris W. Lee, Fremont, CA (US)

(73) Assignee: KLA-Tencor Corp., Milpitas, CA (US)

( * ) Notice: Subject to any disclaimer, the term of this patent is extended or adjusted under 35 U.S.C. 154(b) by 136 days.

(21) Appl. No.: 13/793,709

(22) Filed: Mar. 11, 2013

(65) Prior Publication Data

US 2014/0133737 A1 May 15, 2014

Related U.S. Application Data

(60) Provisional application No. 61/725,244, filed on Nov. 12, 2012.

(51) Int. Cl.
*G06K 9/00* (2006.01)
*G06T 7/00* (2006.01)

(52) U.S. Cl.
CPC .................................. *G06T 7/0008* (2013.01)
USPC ............................ 382/145; 382/148; 382/149

(58) Field of Classification Search
None
See application file for complete search history.

(56) References Cited

U.S. PATENT DOCUMENTS

| | | |
|---|---|---|
| 5,544,256 A | 8/1996 | Brecher et al. |
| 5,991,699 A | 11/1999 | Kulkarni et al. |
| 6,265,232 B1 | 7/2001 | Simmons |
| 6,445,199 B1 | 9/2002 | Satya et al. |
| 6,483,938 B1 | 11/2002 | Hennessey et al. |
| 6,613,590 B2 | 9/2003 | Simmons |
| 6,630,996 B2 * | 10/2003 | Rao et al. ................... 356/237.5 |
| 6,718,526 B1 | 4/2004 | Eldredge et al. |
| 6,792,367 B2 | 9/2004 | Hosoya et al. |
| 6,890,775 B2 | 5/2005 | Simmons |
| 7,171,038 B2 | 1/2007 | Adler et al. |
| 7,274,444 B2 | 9/2007 | Furman et al. |
| 7,295,695 B1 | 11/2007 | Dayal |
| 7,570,797 B1 | 8/2009 | Wang et al. |

(Continued)

FOREIGN PATENT DOCUMENTS

| | | |
|---|---|---|
| EP | 0 910 123 | 4/1999 |
| JP | 3255292 | 11/2001 |

(Continued)

OTHER PUBLICATIONS

International Search Report and Written Opinion for PCT/US2013/069285 mailed Feb. 21, 2014.

*Primary Examiner* — Thomas Conway
(74) *Attorney, Agent, or Firm* — Ann Marie Mewherter

(57) ABSTRACT

Methods and systems for generating unbiased wafer defect samples are provided. One method includes selecting the defects detected by each of multiple scans performed on a wafer that have the most diversity in one or more defect attributes such that a diverse set of defects are selected across each scan. In addition, the method may include selecting the defects such that any defect that is selected and is common to two or more of the scans is not selected twice and any defects that are selected are diverse with respect to the common, selected defect. Furthermore, no sampling, binning, or classifying of the defects may be performed prior to selection of the defects such that the sampled defects are unbiased by any sampling, binning, or classifying method.

20 Claims, 3 Drawing Sheets

(56) References Cited

U.S. PATENT DOCUMENTS

| | | | |
|---|---|---|---|
| 7,912,276 B2 | 3/2011 | Shibuya et al. | |
| 8,055,058 B2 * | 11/2011 | Moon et al. | 382/145 |
| 8,532,949 B2 | 9/2013 | Teh et al. | |
| 2003/0014205 A1 | 1/2003 | Tabor | |
| 2003/0025904 A1 | 2/2003 | Sakai et al. | |
| 2003/0050761 A1 | 3/2003 | Okabe et al. | |
| 2003/0130806 A1 | 7/2003 | Mizuno et al. | |
| 2004/0091142 A1 | 5/2004 | Peterson et al. | |
| 2004/0223639 A1 | 11/2004 | Sato | |
| 2004/0228515 A1 | 11/2004 | Okabe et al. | |
| 2005/0004774 A1 | 1/2005 | Volk et al. | |
| 2005/0037272 A1 | 2/2005 | Tanaka | |
| 2005/0062963 A1 | 3/2005 | Yoshida et al. | |
| 2005/0158887 A1 | 7/2005 | Simmons | |
| 2005/0210423 A1 | 9/2005 | Liao et al. | |
| 2005/0288893 A1 | 12/2005 | Gassner | |
| 2006/0010416 A1 | 1/2006 | Keck et al. | |
| 2006/0287751 A1 | 12/2006 | Dishner et al. | |
| 2007/0156379 A1 | 7/2007 | Kulkarni et al. | |
| 2008/0295048 A1 | 11/2008 | Nehmadi et al. | |
| 2009/0080759 A1 * | 3/2009 | Bhaskar et al. | 382/141 |
| 2011/0196639 A1 | 8/2011 | Chen et al. | |
| 2012/0027285 A1 * | 2/2012 | Shlain et al. | 382/149 |

FOREIGN PATENT DOCUMENTS

| | | |
|---|---|---|
| JP | 2002-303586 | 10/2002 |
| JP | 2003-86645 | 3/2003 |
| JP | 2004-281681 | 10/2004 |
| JP | 2005-507557 | 3/2005 |
| WO | 02/095802 | 11/2002 |
| WO | 03/077291 | 9/2003 |

* cited by examiner

UNBIASED WAFER DEFECT SAMPLES

BACKGROUND OF THE INVENTION

1. Field of the Invention

This invention generally relates to methods and systems for generating unbiased wafer defect samples.

2. Description of the Related Art

The following description and examples are not admitted to be prior art by virtue of their inclusion in this section.

One of the most important tasks during setup of wafer inspection recipes is to identify as many defect types, both real and nuisance, as can be detected on a wafer. As automated recipe setup and tuning becomes more important, the need to automatically identify a good set of defects for this optimization (both nuisance and real) becomes increasingly important as well. Without a good training set, automated optimization cannot function well. In addition, during manufacturing ramp up, when high and unknown defectivity is an issue, it is equally important to identify all defects on a wafer, even though in this situation, the interest is primarily in killer defects.

The need for developing effective sampling algorithms that achieve maximum defect type diversity for both real and nuisance events has been growing with the increasing challenges in optical inspections. As the sizes of defects of interest (DOIs) shrink, optical inspections struggle to maintain differential sensitivity to these defects. To achieve the desired sensitivity, inspections tend to rely less on sophisticated defect detection algorithms and more on complex nuisance filters that leverage the wealth of defect properties (or attributes). However, tuning such filters requires a defect population that is representative of all defect types, both nuisance and real.

Examples of some methods that are currently used to sample defects from a population are described in U.S. Pat. No. 6,265,232 issued Jul. 24, 2001 to Simmons, U.S. Pat. No. 6,613,590 issued Sep. 2, 2003 to Simmons, U.S. Pat. No. 6,792,367 issued Sep. 14, 2004 to Hosoya et al., U.S. Pat. No. 6,890,775 issued May 10, 2005 to Simmons, and U.S. Pat. No. 7,912,276 issued on Mar. 22, 2011 to Shibuya et al. and U.S. Patent Application Publication Nos. 2005/0158887 published Jul. 21, 2005 to Simmons and 2008/0295048 published on Nov. 27, 2008 to Nehmadi et al., all of which are incorporated by reference as if fully set forth herein.

Four different methods are also available with products that are commercially available from KLA-Tencor, Milpitas, Calif. for sampling diverse populations of defects. For example, on-tool diversity sampling (DS) uses a mix of a hard-coded attribute-based binner and an unbiased diversification algorithm using the defect feature vector space. Initial Defect Finder (IDF) is available off-line in Impact software and combines the power of Smart Sampling with iDO binning and with the ability to accumulate a sample from diverse scans without double sampling into a single diverse sample. Class code sampling (CCS) is available both on-tool and off-line and achieves diversification through careful manual tuning of iDO classifiers and targeted sampling from the various bins. In addition, rule based sampling (RBS) is available in Klarity Defect and also on-tool under the name of Precision Sampling and works in principle in the same way as CCS.

On-tool DS definitely improves sample diversity when compared to random sampling. It does find occasional use in the field as an initial defect finder, but, by and large, it has not been strongly adopted. There are two reasons for the low adoption. First, the sample diversification is typically incomplete and defect types are routinely missed. In addition, there is no way to adjust the sampling behavior (except for sample size) or to modify the diversification criteria. Fundamentally, there are two problems with the diversification approach of this sampling scheme. First, it relies on a hard-coded binner, which is not adaptive to the data. Second, the feature vector space is substantially large (about 80 dimensions) with many correlated and noise features that make the diversification in the space inefficient.

CCS relies entirely on iDO binning as a diversification mechanism, which poses two fundamental problems for unbiased discovery. For example, by its nature, iDO binning requires construction and tuning of the classifier trees, a process that requires prior knowledge and some assumption about defect properties on the wafer. This is obviously difficult before all defects have been discovered. In addition, such trees are not adaptive to the data and cannot work well across the board even if they work well on one dataset. Any qualitatively new wafer needs new binner tuning to achieve best diversification. The second problem is that no diversification within bins is possible and thus this sampling only works well when the bins are fairly homogenous, which is hardly ever the case. RBS is plagued with the same problems as CCS. Even though it does not rely necessarily on the iDO binner, in effect, the sampling rules set up cut lines and thresholds just as iDO does.

IDF, as implemented today, relies on iDO binning for diversification and on CCS to produce the diverse sample and thus contains all the disadvantages of that sampling scheme. Its ability to (a) accumulate a sample across different scans without double sampling and (b) use capture rate of the defects in multiple scans as a new diversification attribute are its only advantages over CCS.

Accordingly, it would be advantageous to develop systems and/or methods for generating a defect sample for a wafer that can find a diverse population of real and nuisance defects in substantially noisy inspections, go beyond the capabilities of the current methods, are much simpler to use, significantly improve time to result, and retain the flexibility of configuring biased sampling schemes in cases that some prior knowledge exists.

SUMMARY OF THE INVENTION

The following description of various embodiments is not to be construed in any way as limiting the subject matter of the appended claims.

One embodiment relates to a computer-implemented method for generating a defect sample. The method includes identifying individual defects common to two or more of sets of defects. Each of the sets of defects is produced by a different one of multiple scans of a wafer. The method also includes acquiring two or more sampling parameter sets, one for each of the multiple scans such that each of the two or more sampling parameter sets corresponds to one of the sets of defects. The two or more sampling parameter sets are selected independent of each other by a user. Each of the two or more sampling parameter sets includes one or more defect attributes. The method further includes selecting defects from each of the sets of defects based on the two or more sampling parameter sets. The selecting step includes selecting, from each of the sets of defects, defects having the most diversity in the one or more defect attributes in the sampling parameter set corresponding to each of the sets of defects. The selecting step also includes, if the defects selected from a first of the sets of defects include one of the individual defects that is common to the first set of defects and at least a second of the sets of defects, selecting defects from the second set of defects that are diverse with respect to the one or more defect attributes, in the sampling parameter set corresponding to the second set of defects, of the one of the individual defects and not selecting a defect in the second set of defects that is common with the one of the individual defects. In addition, the method includes creating a defect sample for the wafer that includes the defects selected from each of the sets of defects. The identifying, acquiring, selecting, and creating steps are performed by a computer system.

The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for generating a defect sample for a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to generate a defect sample for a wafer. The system includes an inspection subsystem configured to perform multiple scans of a wafer to produce sets of defects, each produced by a different one of the multiple scans. The system also includes a computer subsystem configured for performing the identifying, acquiring, selecting, and creating steps of the method described above. The system may be further configured as described herein.

BRIEF DESCRIPTION OF THE DRAWINGS

Other objects and advantages of the invention will become apparent upon reading the following detailed description and upon reference to the accompanying drawings in which.

Figure 1:
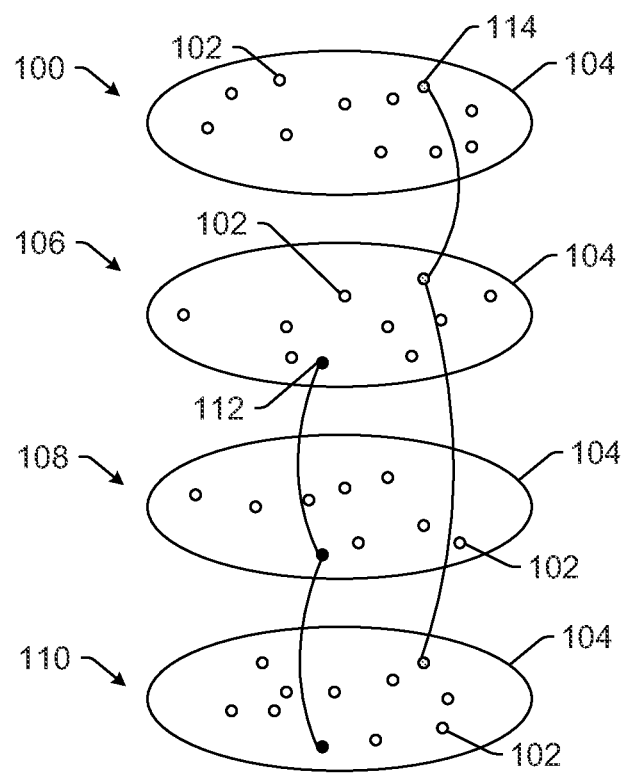
FIGS. 1-3 are schematic diagrams illustrating different steps that may be included in some embodiments of a method for generating a defect sample for a wafer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a computer-implemented method for generating a defect sample for a wafer. In general, the embodiments described herein provide novel diversification methods and systems for initial defect finding that can be used for unbiased, and optionally biased, discovery of defect types. The embodiments described herein fundamentally change the way in which a defect population for optics mode selection or other purposes can be generated. The embodiments described herein can be implemented as offline methods. For example, the embodiments described herein can be implemented in IMPACT, an off-line application designed for classifier tuning, which is commercially available from KLA-Tencor, Milpitas, Calif.

The embodiments described herein may leverage existing methods and systems such as the Initial Defect Finder (IDF) sampling framework described further above. The IDF framework allows loading multiple scans into software, finding common defects between scans, binning defects in each scan using pre-constructed iDO classifiers, and sampling defects from each of the scans. The embodiments described herein simplify the setup and flow of current IDF methods and systems significantly and introduce entirely different sampling strategies and capabilities.

The method includes identifying individual defects common to two or more of sets of defects. Each of the sets of defects is produced by a different one of multiple scans of the wafer. For example, this step may include loading results of multiple scans of a wafer and finding common defects between scans. The results of the scans may include any inspection results produced by any inspection system. For example, the inspection results may include a KLARF file, which can be produced by inspection systems commercially available from KLA-Tencor. A user may select the inspection results file to be used for sampling described further herein.

In one such example, inspection results 100 for a first scan of a wafer are shown in FIG. 1 as a number of defects 102 detected at various positions on wafer 104. Inspection results 106, 108, and 110 for second, third, and fourth scans of the wafer, respectively, are similarly shown in FIG. 1. The inspection results may therefore include information about the defects detected on the wafer such as the locations of the defects detected on the wafer and any other information for the defects detected on the wafer during the scans such as defect attributes determined for the defects and image data or images generated for the defects during the scans.

As shown in FIG. 1, defect 112 is common between inspection results 106, 108, and 110. In other words, a defect has been detected at substantially the same wafer location in the scans corresponding to inspection results 106, 108 and 110 and therefore that defect may be identified as a defect that is common to two or more scans of the wafer and thereby two or more of the sets of defects. In addition, defect 114 is common between inspection results 100, 106, and 110. In this manner, a defect has been detected at substantially the same wafer location in the scans corresponding to inspection results 100, 106, and 110 and therefore the defect may be identified as a defect that is common to two or more scans of the wafer and the two or more of the sets of defects corresponding to those scans. As such, identifying individual defects that are common to two or more of the sets of defects may include comparing locations of the individual defects in different sets of defects to each other and any defects that are included in two or more of the sets of defects and have wafer locations that are substantially the same may be identified as the common defects.

The method also includes acquiring two or more sampling parameter sets, one for each of the multiple scans such that each of the two or more sampling parameter sets corresponds to one of the sets of defects. In this manner, different sampling parameter sets can be used for different sets of defects, each produced by one of multiple scans performed on a wafer.

The two or more sampling parameter sets are selected independent of each other by a user. Therefore, the embodiments described herein use a new concept for setting up a diversity sampling scheme. For example, the embodiments described herein may include displaying a user interface (UI) to a user that is configured to prompt and/or allow the user to set up the defect sampling by configuring the sampling for each scan. In this manner, the user may set up the diversification described further herein. In addition, the user may set up diversification with respect to a particular inspection results file that can be selected by the user.

Each of the two or more sampling parameter sets includes one or more defect attributes. In this manner, the two or more sampling parameter sets may include a list of defect attributes per scan. The embodiments described herein provide great flexibility of diversification in the user-defined attribute space with respect to defects present in the selected inspection results file. For example, the UI described above may display a list of defect attributes such as capture rate (or "caprate"), defect polarity, detection algorithm parameters such as MDAT offset, MDAT gray level, and the like, energy parameter(s), defect region ID, defect magnitude, roughness, brightness, horizontal distance to care area border, vertical distance to care area border, etc. The MDAT defect detection algorithm is used by inspection systems commercially available from KLA-Tencor. The user may then select any number of the listed defect attributes for each of the sampling parameter sets. Therefore, with the approaches described herein, sampling is easy to set up and is based on unbiased diversification in the user-defined defect attribute space. As such, the embodiments described herein provide significant advantages over currently available sampling methods in that the sample diversification is performed in a user-defined space of defect attributes thereby providing users with control over the diversification space using a substantially simple tuning mechanism, particularly since specifying the list of attributes is frequently an intuitive and simple step. The sampling schemes described herein are therefore easy to extend and apply to different use cases.

The defect attributes used for each scan may be different from each other. For example, in one embodiment, at least one of the one or more defect attributes included in at least one of the two or more sampling parameter sets is different than at least one of the one or more defect attributes included in at least one other of the two or more sampling parameter sets. However, the same one or more defect attributes may be included in two or more sampling parameter sets. For example, the sampling parameter sets used for two scans of a wafer may be the same while the sampling parameter set used for another scan of the wafer may be different from the sampling parameter sets used for the other two scans. Even if the sampling parameter sets are selected by a user to be the same for two or more of the scans, the user may still select the sampling parameters for those scans independent of each other and all other scans of the wafer.

The two or more sampling parameter sets may also include a defect sample size for each of the multiple scans. In this manner, the two or more sampling parameter sets may include a sample size per scan. In addition, the user can configure the sampling with different attribute sets and sample sizes. For example, the user can choose the number of defects to sample and the list of attributes to use for diversification. The user can therefore use different settings (attributes and samples sizes) for different lots. The user can also choose to perform across lot diversification. As such, the embodiments described herein provide significant advantages over currently available sampling methods in that the sampling setup can be limited to specifying sample size and selection of attributes to be used for the diversity space.

The method further includes selecting defects from each of the sets of defects based on the two or more sampling parameter sets. Therefore, defects are sampled from each scan. In addition, the defects may be independently or separately selected from each of the scans. However, as described further herein, the defects selected from one scan may be used to sample defects from another scan. As such, the embodiments described herein retain certain advantages of currently used sampling methods including the ability to sample from multiple scans and to use defect capture rate as one of the diversification and/or nuisance suppression mechanisms. The selecting step may be further performed as described herein.

The selecting step includes selecting, from each of the sets of defects, defects having the most diversity in the one or more defect attributes in the sampling parameter set corresponding to each of the sets of defects. A diverse sample as described herein is characterized by sampling representatives from all regions in a diversification space defined by the one or more defect attributes included in the two or more sampling parameter sets. For example, the sampled defects may be substantially uniformly distributed across the diversification space. Any of a number of algorithms that currently exist can be used in the embodiments described herein to achieve this sampling goal with slight variations and somewhat different capabilities. In general, selecting defects having the most diversity may include selecting a first defect randomly from a set of defects and then sampling defects having values for the one or more defect attributes that are farthest from the values of the one or more defect attributes of the already sampled defect.

Figure 2:
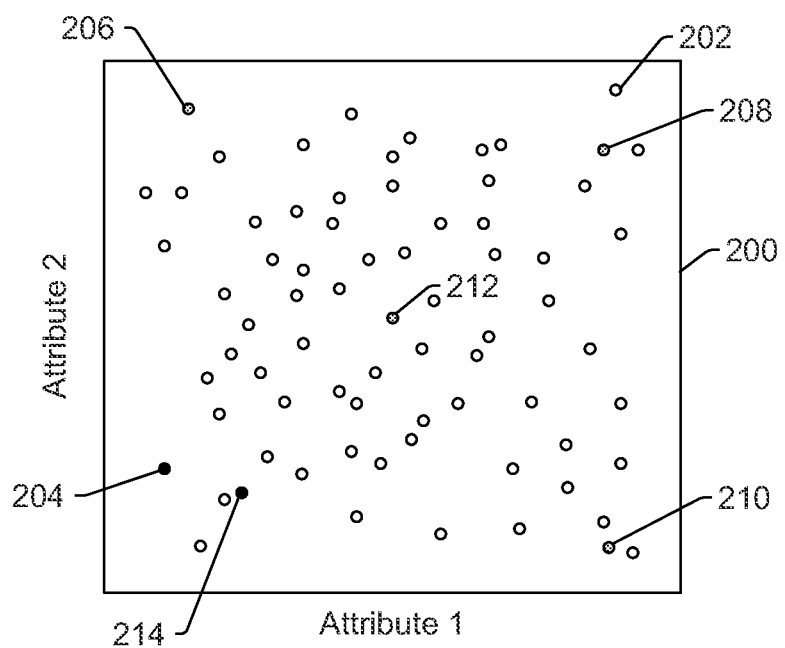

The diversification space may, as shown herein, be a two-dimensional space. For example, as shown in FIG. 2, diversification space 200 may be a two-dimensional space that is defined by Attribute 1 along the horizontal axis and Attribute 2 along the vertical axis. In one embodiment, Attribute 1 may be defect magnitude while Attribute 2 may be defect energy. However, the diversification space may be defined by any of the defect attributes described herein or known in the art. The number of dimensions that define the diversification space may be user-defined in that the user may select any number of defect attributes for the sampling parameter sets and the selected number of defect attributes will define the dimensions of the diversification space for each parameter set and each scan and defect set.

As shown in FIG. 2, defects 202 may be distributed across the diversification space and the position of each of the defects within the diversification space will be determined by the defect attribute values for each of the defects. Therefore, using such information, defects that are distributed across the diversification space can be selected by the embodiments described herein. For example, defects 204, 206, 208, 210, and 212 may be selected, from one of the sets of defects, as the defects having the most diversity in the two or more defect attributes that define the diversification space shown in FIG. 2.

The selecting step also includes, if defects selected from a first of the sets of defects include one of the individual defects that is common to the first set of defects and at least a second of the sets of defects, selecting defects from the second set of defects that are diverse with respect to the one or more defect attributes, in the sampling parameter set corresponding to the second set of defects, of the one of the individual defects and not selecting a defect in the second set of defects that is common with the one of the individual defects. As such, the embodiments described herein may include across-scan diversification. For example, any time a defect is sampled, it can also be identified in all scans in which it was detected. All subsequent samples from any of those scans are diversified with respect to this defect using its attributes from the corresponding scans. In other words, the attribute(s) that are used to select a common defect from one scan may be different than the attribute(s) that are used to diversify the defect sample in another scan with respect to that common defect. Such a situation may particularly be the case when at least some of the scans are performed with one or more different parameters (which may include one or more different hardware and/or software parameters). In this manner, the method may include sampling defects from each scan and diversifying with respect to all sampled defects. In addition, the sample diversification capabilities described herein may be extended across multiple scans of the same wafer, even for scans performed with different inspection recipe settings (optics and/or sensitivity).

In one such example, some of the defects shown in the diversification space of FIG. 2 may be common to another of the sets of defects. In particular, defects 204 and 214 may be common to one or more of the other sets of defects. In addition, defects 204 and 214 may have been already sampled from those other set(s) of defects corresponding to other scan(s) of the wafer. Therefore, the defects sampled from the set of defects shown in FIG. 2 may include defects 206, 208, 210, and 212 but not defects 204 and 214 or any other defects in the same portion of the diversification space as defects 204 and 214. In this manner, defects 204 and 214 may be defects that have already been sampled in previous scan(s) and newly sampled defects 206, 208, 210, and 212 may be diversified with respect to the defects sampled in other scan(s).

The method also includes creating a defect sample for the wafer that includes the defects selected from each of the sets of defects. Therefore, the created defect sample may be a cumulative sample that has representative defects from all scans performed on a wafer. The created defect sample may be output as an inspection results file that can be used by any other method or system or can be used by the methods and systems described herein. The inspection results file that includes the created defect sample may also include any information generated for the created defect sample by the embodiments described herein possibly in combination with other information from the inspection results file used by the embodiments described herein.

The identifying, acquiring, selecting, and creating steps described above are performed by a computer system, which may be configured as described herein.

In some embodiments, sampling, binning, or classifying the defects in the sets of defects is not performed prior to the selecting step described above. Therefore, the defect population on which the sampling is performed may be truly unbiased. In other words, the defect population used for sampling is not biased by a sampling, binning, or classifying method applied to the defect population since such sampling, binning, or classifying would be biased during setup by a user or other method or system. For example, the subjectivity or experience of a user who sets up the sampling, binning or classifying could affect parameters of the sampling, binning, or classifying such as cut lines and bin tuning, which would produce biased samples. In addition, custom decision trees for defect binning are data dependent and must be tuned thereby preventing a best known method from being created that can be used across wafers and scans. More particularly, bin content can shift with wafers, layers, and/or devices, and different sample allocation per bin may be required to keep sampling optimal.

The embodiments described herein, therefore, provide significant advantages over any other currently available sampling or diversity sampling approach. For example, the embodiments described herein eliminate the need for setting up, tuning, and/or running iDO classifiers or any other rule-based binner to sample defects. Therefore, the resulting defect sample is free of any bias from classifier tuning. In addition, the sampling schemes described herein are trivial to configure compared to existing methods. Furthermore, the embodiments described herein are adaptable to variations in the data (the data produced by the multiple scans, i.e., the inspection results). For example, unlike currently used methods for defect sampling, the embodiments described herein are universally applicable because they do not rely on templates that are specific to a particular wafer and/or particular defects. Furthermore, the embodiments described herein will be significantly less complex than any sampling schemes that use classified defects as input because even the simplest classifier templates can contain many bins (e.g., 20 or more). Therefore, the embodiments described herein will have a positive impact on time to DOI and on reliability. In addition, the embodiments described herein can avoid the undersampling problems of many currently used sampling schemes.

However, the defect population on which the selecting step is performed may have been filtered, sampled, binned, or classified prior to the selecting step. For example, an advanced option may be provided to the user to perform diversification within each bin or class independently or globally across bins or classes. As such, a user may select if across bin or class diversification needs to be performed. In one such example, Smart Sampling may be performed on the entire population of defects detected on the wafer by the multiple scans to produce a defect subpopulation that may be used in the selecting step described herein. Smart Sampling may be performed during the multiple scans. The Smart Sampling results may be stored in an inspection results file such as a KLARF file and the KLARF file may be selected as input to the selecting step. Therefore, diversification may be performed with respect to the defects present in the KLARF during sampling.

In another embodiment, the method includes separating the defects in at least one of the sets into segments of defects. The segments of defects may be bins, classes, or other subpopulations of the defects. For example, the basic method described above may be combined with defect binning to create a powerful and flexible sampling strategy for identifying a variety of defect types. This approach can produce a carefully constructed biased sample in cases when the results produced by the basic method are not satisfactory. The defect population may be segmented using iDO binning or any other approach such as filtering. The user may set up the iDO decision tree used for binning or a pre-existing decision tree may be used. For example, classifier templates may be used to create segments of defects for each of the scans. In one such example, the defects may be classified based on polarity into three different classes: bright, mixed, and dark.

Such an embodiment may also include acquiring two or more additional sampling parameter sets, one corresponding to each of the segments of defects. The two or more additional sampling parameter sets are selected independent of each other by the user. The user may select the additional sampling parameter sets in a manner similar to that described above. In this manner, the diversification space and sampling strategy for each of the population segments may be defined independently. For example, the user may set up sampling per rough bin or class. Each of the two or more additional sampling parameter sets include one or more additional defect attributes, such as the defect attributes described further herein. Therefore, the method may include acquiring defect attribute(s) per segment or bin. For example, the user may select the list of attributes per segment to be used for diversification. As such, one significant advantage of the embodiments described herein is that they can support the ability to sample from iDO bins and construction of a different or independent diversification space for each bin. This capability dramatically increases the flexibility and customization of the sampling methods and systems described herein.

In some embodiments, each of the two or more additional sampling parameter sets includes a defect sample size for each of the segments. For example, the sample size per segment or bin may be selected independently by a user. The same number of defects may be selected from each of the segments. In one such example, the user may elect to have 100 defects selected from each bin. However, the number of defects selected from each segment or bin may be different.

In such embodiments, selecting the defects from each of the sets of defects may include selecting defects from each of the segments of defects based on the two or more additional sampling parameter sets. Therefore, the selecting step may include per segment or per bin selection. This selecting step may be further performed as described herein.

In some such embodiments, selecting the defects from each of the sets of defects also includes selecting, from each of the segments of defects, defects having the most diversity in the one or more additional defect attributes in the additional sampling parameter set corresponding to each of the segments of defects. In this manner, the selecting step may produce a diverse sample of defects from each scan and each segment by allowing diversification across bins and scans. This step may be performed in a manner similar to that described above for across scan diversification.

In addition, if the defects selected from a first of the segments of defects in the first set of defects include one of the individual defects that is common to the first set of defects and at least the second set of defects, the selecting step may include selecting defects from a second of the segments of defects in the second set of defects that are diverse with respect to the one or more additional defect attributes, in the additional sampling parameter set corresponding to the second of the segments, of the one of the individual defects and not selecting a defect in the second of the segments that is common with the one of the individual defects. In this manner, the embodiments described herein may avoid double sampling of the same defect from different segments in different sets of defects detected by different scans of the wafer. These steps may be performed as described further above.

In another embodiment, at least two of the segments correspond to two or more areas on the wafer spaced at different distances from an edge of the wafer. For example, the user may wish to use different diversification spaces at the edge and interior of the wafer, where frequently defect properties are different. The segments may be selected to correspond to any other areas on the wafer that have different within-wafer locations. In an additional embodiment, at least two of the segments correspond to different regions of interest on the wafer. For example, a user may wish to suppress or enhance a sample from a particular sensitivity region of interest.

In some embodiments, at least one of the defects in at least one of the sets of defects is a known defect, and selecting, from each of the sets of defects, the defects having the most diversity includes selecting from at least the one of the sets of defects, defects having the most diversity, in the one or more defect attributes in the sampling parameter set corresponding to the at least one of the sets of defects, with respect to the known defect. In this manner, sample shaping may be performed based on known defect(s) or a user selected set of defects detected on the wafer. For example, one approach to sample shaping believed to be available only with the embodiments described herein relies on using a set of known defects to exclude from the sample defects that are similar to them. These defects can either be previously sampled defects or simply defects obtained by other means. For example, the known defect(s) may come from an inspection results file such as a KLARF. The known defect(s) can then be matched to other defects in the lot results of the inspection results for which a defect sample is being created, excluded from the sample, and their attributes used to sample defects different from them. In other words, the known defect(s) may be matched against defects in each scan and when found in a scan, the sampling from this scan can be performed in such a way as to produce a sample that is different (diverse) from the matched defects. In this manner, a known defect can be found in one or more of the scans, and the sampled defects can be far from the known defect(s), i.e., diverse with respect to the known defect(s). In one such example, if defect 204 shown in FIG. 2 is a known defect, then the defects that are selected from the set of defects that includes the known defect may include defects 206, 208, and 210, which as shown in FIG. 2 are spaced far from the known defect in the diversification space. Therefore, the embodiments described herein provide significant advantages over currently used methods for sampling in that they provide the ability to diversify a defect sample with respect to defect(s) such as a user-selected set of defects on the wafer that are not to be sampled.

In another embodiment, at least one of the two or more sampling parameter sets includes one or more biasing parameters for at least one of the one or more defect attributes in the at least one sampling parameter set. Therefore, the embodiments described herein may be configured for sample shaping with biasing criteria, and another approach to sample shaping combines sample diversification with sample biasing. The capability to define how to bias the diverse sample may be provided by specifying a defect attribute (or several attributes or some other criteria such as patches for identifying optical real defects) whose values are desired in the sample. For example, if we wish to obtain a diverse sample of only DOIs with the nuisance population suppressed, defects with large MDAT offset values (threshold values) may be preferentially sampled.

In one such embodiment, selecting, from each of the sets of defects, defects having the most diversity includes selecting, in a diversification space defined by the one or more defect attributes in the sampling parameter set corresponding to at least one of the sets of defects, regions having the most diversity from each other and selecting one or more of the defects in each of the regions based on the one or more biasing parameters. Therefore, the embodiments described herein may perform combined sample diversification and biasing.

For example, biasing can be achieved by (a) providing the capability to configure the biasing attributes as described further above and (b) performing a two-staged sampling in which the diversifying stage may select regions in the diversification space (instead of defects) and the biasing stage can then select one of the defects in the regions based on the biasing criteria.

Figure 3:
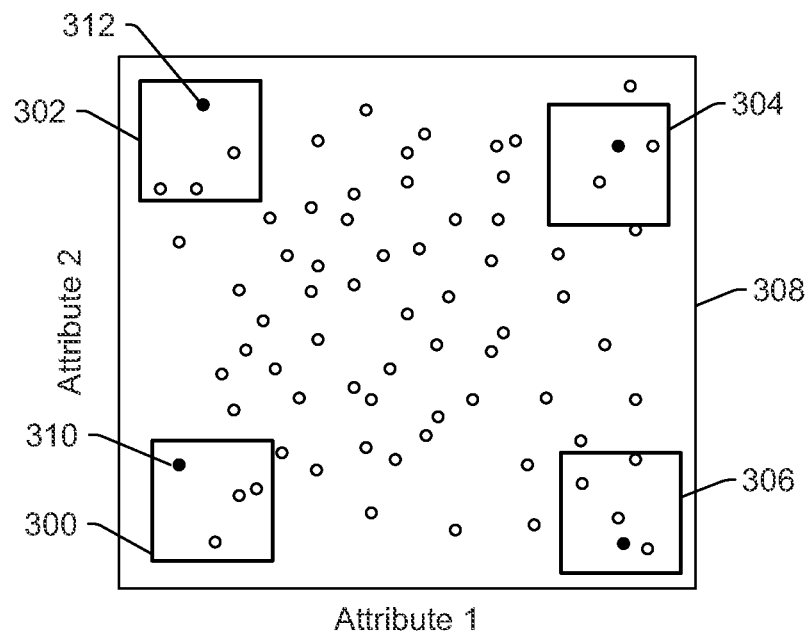

In one such embodiment, as shown in FIG. 3, the diversification portion of the sampling may select regions 300, 302, 304, and 306 in diversification space 308, which may be configured as described further herein, that are representative of the diversification space. Defects may then be sampled from the regions. For example, the biasing portion of the sampling will select defects in each region to sample based on the biasing criteria. All defects within a single region may be substantially similar to each other based on the specified diversification criteria. Therefore, no more than one defect may be selected from each region. For example, defect 310 may be selected from region 300, defect 312 may be selected from region 302, and so on.

As described above, each of the sets of defects is produced by a different one of multiple scans of a wafer. In one embodiment, at least one of the multiple scans is a hot scan. Scans performed with relatively aggressive detection settings are generally referred to as "hot scans" that are often used to purposefully detect both defects of interest and nuisance or noise on a wafer. For example, a "hot scan" may use a threshold value in a defect detection algorithm that would be too low for a regular inspection of a wafer. In another embodiment, at least two of the multiple scans are performed with different values for one or more parameters of an inspection system that performs the multiple scans. For example, a user may receive a sample wafer from a new device and a list of modes covering the span of apertures, wavelengths, and any other possible variable settings of an inspection system. The user or the embodiments described herein may then narrow the modes from all of the possible modes of the inspection system to fewer than all of the modes (e.g., about 10 representative modes). The modes may be selected such that all possible defect types are captured in at least one scan. The user may then configure one step threshold setup (OSTS) hot scan recipes in each of the prescribed modes and run them (possibly with Smart Sampling enabled) to collect the sets (or "lots") of defects. Therefore, the embodiments described herein provide advantages over currently used sampling methods including the ability to extend the diversification process across different scans of the same wafer, even for scans performed with different optics and/or sensitivity settings.

In one embodiment, the method includes setting up an inspection recipe based on the defect sample. In another embodiment, the defect sample includes real defects and nuisance defects. For example, the defect sampling can be set up by the user such that both real and nuisance defects are sampled such that information about both real and nuisance defects can be used to set up the inspection recipe. In this manner, the embodiments described herein can identify a relatively small, but substantially diverse, sample of defects to be used for automatic or manual recipe set up or optimization. Setting up the inspection recipe using the defect sample may be performed in any suitable manner known in the art and may include selecting one or more hardware parameters (e.g., optical parameter(s) such as illumination wavelength and/or angle of incidence) and/or one or more software parameters (e.g., defect detection parameters such as threshold of a defect detection algorithm). For example, the defect sample, including the much more diversified set of defects, may be sent to a defect review tool and used with the wafer to classify one or more of the sampled defects. In this manner, the user may classify one or more of the defects in the created sample and use the classified defects along with the wafer for recipe optimization. Therefore, the initial defect list may be used for further analysis for recipe optimization. The embodiments described herein are particularly advantageous for inspection recipe analysis and/or set up because using the embodiments described herein, more DOI types can be sampled faster than in manual sampling by automating the process of multiple optics mode analysis.

In some embodiments, the wafer has unknown defectivity. For example, the embodiments described herein can identify a relatively small, but substantially diverse, sample of defects to be used for engineering analysis during device ramp up. In addition, the embodiments described herein can reduce the time-to-DOI and improve DOI sampling on unknown layers and devices by running multiple optics modes. Furthermore, the unknown defectivity may not be just unknown locations and numbers of known defect types of interest on a wafer, but unknown defect types of interest. For example, as described above, the wafer may be fabricated during device ramp up of an unknown layer and device. Therefore, any information about what kinds of defects may be present on the wafer and characteristics of any defects that may be present on the wafer may be unknown. Such information can, however, be acquired using a defect sample created as described herein.

The embodiments described herein are, therefore, different from currently used methods for generating wafer defect samples in a number of important ways. For example, the sampling step described in U.S. Pat. No. 7,912,276 issued on Mar. 22, 2011 to Shibuya et al. takes into consideration defect features distribution, where a one- or two-dimensional feature space is divided into cells with respect to the feature and sampling within each cell is done randomly. The approach described herein is therefore fundamentally different than that described by Shibuya et al., provides capabilities such as across lot and/or bin diversification and diversification with respect to defects in an inspection results file, and the diversification step does not have the aforementioned limitation of random sampling within each cell. The methods described by Shibuya et al. are also limited to two-dimensional feature space (three or more dimensions are compressed to two dimensions if taken into consideration) unlike the methods described herein that can perform diversification in multi-dimensional user-defined attribute space.

U.S. Pat. No. 6,890,775 issued May 10, 2005 to Simmons describes sampling of wafer level defects. The sampling described in this patent is random, except for using defect size for achieving some diversity of sampling. However, the methods described in this patent do not perform diversification with respect to the various user-selected attributes described herein.

U.S. Pat. No. 6,792,367 issued Sep. 14, 2004 to Hosoya et al. describes a method to sample defects based on statistical criteria. The method also allows a user to select a percentage or number of defects to sample from different regions of a wafer, and the sampling may be based on the density of defect distribution. While the method provides some flexibility, the criteria is based only on clustering and user-selected regions. The methods described in this patent do not include the unbiased discovery or the flexibility of diversification in user-defined space described herein.

U.S. Patent Application Publication No. 2008/0295048 published on Nov. 27, 2008 to Nehmadi et al. describe methods that take geometric characteristics and design data of defects into consideration for sampling. However, this information is used for only eliminating the nuisance defects, unlike the methods described herein in which both nuisance and real defects are found via diversification for applications such as better recipe tuning. Also, the approaches described herein for sampling are different than the approaches described in this patent application.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 4:
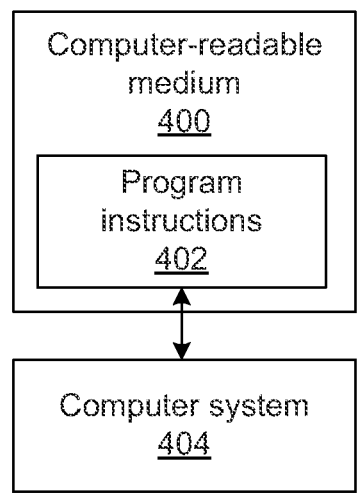
FIG. 4 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for generating a defect sample for a wafer. One such embodiment is shown in FIG. 4. In particular, as shown in FIG. 4, computer-readable medium 400 includes program instructions 402 executable on computer system 404. The computer-implemented method includes the identifying, acquiring, selecting, and creating steps of the method described above. The computer-implemented method for which the program instructions are executable may include any other step(s) described herein.

Program instructions 402 implementing methods such as those described herein may be stored on computer-readable medium 400. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

Figure 5:
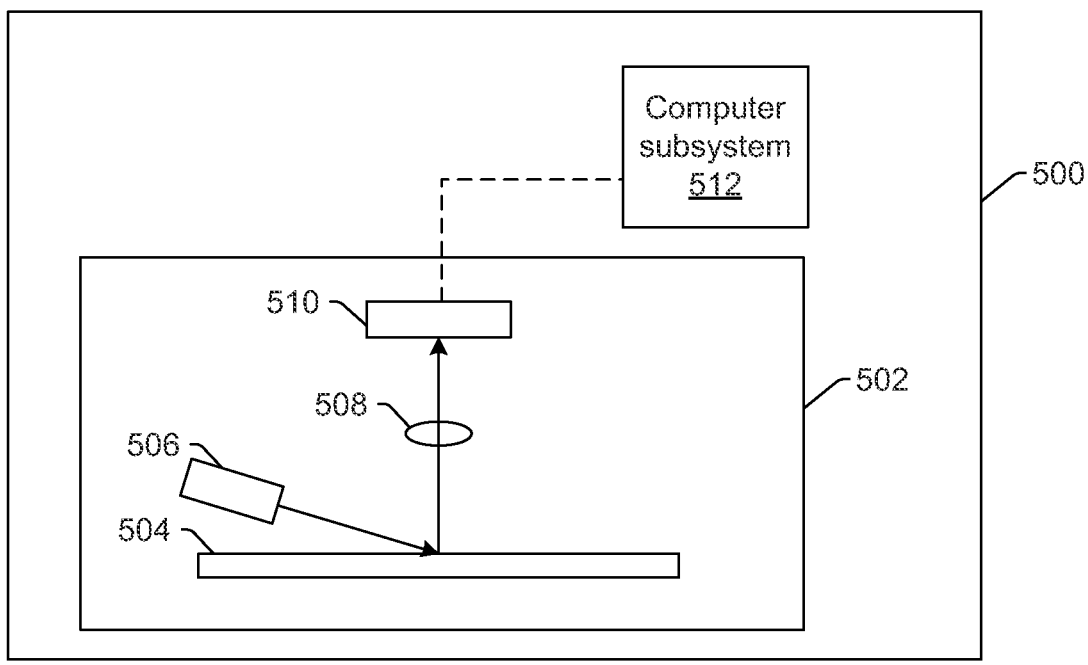
FIG. 5 is a schematic diagram illustrating a side view of one embodiment of a system configured to generate a defect sample for a wafer.

An additional embodiment relates to a system configured to generate a defect sample for a wafer. One embodiment of such a system is shown in FIG. 5. System 500 includes inspection subsystem 502 configured to perform multiple scans of wafer 504 to produce sets of defects, each produced by a different one of the multiple scans. The inspection subsystem includes source 506 that may include any suitable light source in the case of an optical or light-based inspection subsystem. Although the inspection subsystem will be described further herein with respect to a light-based inspection subsystem, the inspection subsystem may be modified in any suitable manner or replaced to make it an electron beam-based inspection subsystem.

Light from the light source may be directed to wafer 504. The light source may be coupled to any other suitable elements (not shown) such as one or more condensing lenses, collimating lenses, relay lenses, objective lenses, apertures, spectral filters, polarizing components and the like. As shown in FIG. 5, the light may be directed to the wafer at an oblique angle of incidence. However, the light may be directed to the wafer at any suitable angle of incidence including near normal and normal incidence. In addition, the light or multiple light beams may be directed to the wafer at more than one angle of incidence sequentially or simultaneously.

Wafer 504 may disposed upon a stage (not shown) while the light is being directed to the wafer. The stage may include any suitable mechanical or robotic assembly and may be configured to move the wafer in one or more directions while the light is being directed to the wafer such that the light can be scanned over the wafer by the inspection subsystem. However, the inspection subsystem may be configured to scan the light over the wafer in any other suitable manner.

The inspection subsystem also includes collector 508 configured to collect light scattered from the wafer (in the case of a dark field capable inspection system), which is configured to direct the collected light to detector 510 that is configured to detect the light scattered from the wafer that is collected by the collector. The collector may include any suitable number and configuration of reflective and/or refractive optical elements. Detector 510 may include any suitable detector. Detector 510 and collector 508 may therefore form at least a portion of a detection subsystem of the inspection subsystem. The detection subsystem may include one or more other suitable elements (not shown) positioned in the optical path between the detector and the wafer such as objective lenses, relay lenses, magnification lenses, zooming lenses, apertures, spectral filters, gratings, and polarizing components. Although the inspection subsystem is shown in FIG. 5 to detect light scattered from the wafer, the inspection subsystem may also or alternatively be configured for bright field (BF) inspection of the wafer. The inspection subsystem may also include more than one detector (not shown), which may be used to detect different light from the wafer simultaneously or sequentially.

The system also includes computer subsystem 512 configured for performing the identifying, acquiring, selecting, and creating steps described herein, which may be performed as described herein. For example, computer subsystem 512 may be coupled to detector 510 by one or more transmission media (not shown), which may include "wired" and/or "wireless" transmission media such that the computer subsystem can receive the output of the detector. The computer subsystem may then use the output to detect defects on the wafer and as described herein. Alternatively, the inspection subsystem may include one computer subsystem that is configured to detect the defects on the wafer, and the system may include another, different computer subsystem that is configured to perform the steps of the methods described herein. The computer subsystem and the system may be configured to perform any other step(s) described herein and may be further configured as described herein.

It is noted that FIG. 5 is provided herein to generally illustrate one configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the Puma 90xx, 91xx, and 93xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, methods and systems for generating a defect sample for a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for generating a defect sample for a wafer, comprising:
   identifying individual defects common to two or more of sets of defects, wherein each of the sets of defects is produced by a different one of multiple scans of a wafer;
   acquiring two or more sampling parameter sets, one for each of the multiple scans such that each of the two or more sampling parameter sets corresponds to one of the sets of defects, wherein the two or more sampling parameter sets are selected independent of each other by a user, and wherein each of the two or more sampling parameter sets comprises one or more defect attributes;
   selecting defects from each of the sets of defects based on the two or more sampling parameter sets, wherein said selecting comprises:
      selecting, from each of the sets of defects, defects having the most diversity in the one or more defect attributes in the sampling parameter set corresponding to each of the sets of defects; and
      if the defects selected from a first of the sets of defects comprise one of the individual defects that is common to the first set of defects and at least a second of the sets of defects:
         selecting defects from the second set of defects that are diverse with respect to the one or more defect attributes, in the sampling parameter set corresponding to the second set of defects, of the one of the individual defects; and
         not selecting a defect in the second set of defects that is common with the one of the individual defects; and
   creating a defect sample for the wafer comprising the defects selected from each of the sets of defects, wherein said identifying, said acquiring, said selecting, and said creating are performed by a computer system.

2. The method of claim 1, further comprising setting up an inspection recipe based on the defect sample.

3. The method of claim 1, wherein the defect sample comprises real defects and nuisance defects.

4. The method of claim 1, wherein the wafer has unknown defectivity.

5. The method of claim 1, wherein sampling, binning, or classifying the defects in the sets of defects is not performed prior to said selecting.

6. The method of claim 1, wherein at least one of the one or more defect attributes included in at least one of the two or more sampling parameter sets is different than at least one of the one or more defect attributes included in at least one other of the two or more sampling parameter sets.

7. The method of claim 1, wherein the two or more sampling parameter sets further comprise a defect sample size for each of the multiple scans.

8. The method of claim 1, wherein at least one of the defects in at least one of the sets of defects is a known defect, and wherein said selecting, from each of the sets of defects, the defects having the most diversity comprises selecting, from at least the one of the sets of defects, defects having the most diversity, in the one or more defect attributes in the sampling parameter set corresponding to the at least one of the sets of defects, with respect to the known defect.

9. The method of claim 1, wherein at least one of the multiple scans is a hot scan.

10. The method of claim 1, wherein at least two of the multiple scans are performed with different values for one or more parameters of an inspection system that performs the multiple scans.

11. The method of claim 1, further comprising separating the defects in at least one of the sets into segments of defects and acquiring two or more additional sampling parameter sets, one corresponding to each of the segments of defects, wherein the two or more additional sampling parameter sets are selected independent of each other by the user, wherein each of the two or more additional sampling parameter sets comprises one or more additional defect attributes, and wherein said selecting the defects from each of the sets of defects further comprises selecting defects from each of the segments of defects based on the two or more additional sampling parameter sets.

12. The method of claim 11, wherein said selecting the defects from each of the sets of defects further comprises selecting, from each of the segments of defects, defects having the most diversity in the one or more additional defect attributes in the additional sampling parameter set corresponding to each of the segments of defects.

13. The method of claim 11, wherein if the defects selected from a first of the segments of defects in the first set of defects comprise one of the individual defects that is common to the first set of defects and at least the second set of defects, said selecting further comprises:
   selecting defects from a second of the segments of defects in the second set of defects that are diverse with respect to the one or more additional defect attributes, in the additional sampling parameter set corresponding to the second of the segments, of the one of the individual defects; and
   not selecting a defect in the second of the segments that is common with the one of the individual defects.

14. The method of claim 11, wherein each of the two or more additional sampling parameter sets further comprises a defect sample size for each of the segments.

15. The method of claim 11, wherein at least two of the segments correspond to two or more areas on the wafer spaced at different distances from an edge of the wafer.

16. The method of claim 11, wherein at least two of the segments correspond to different regions of interest on the wafer.

17. The method of claim 1, wherein at least one of the two or more sampling parameter sets further comprises one or more biasing parameters for at least one of the one or more defect attributes in the at least one sampling parameter set.

18. The method of claim 17, wherein said selecting, from each of the sets of defects, defects having the most diversity comprises selecting, in a diversification space defined by the one or more defect attributes in the sampling parameter set corresponding to at least one of the sets of defects, regions having the most diversity from each other and selecting one or more of the defects in each of the regions based on the one or more biasing parameters.

19. A non-transitory computer-readable medium, storing program instructions executable on a computer system for performing a computer-implemented method for generating a defect sample for a wafer, wherein the computer-implemented method comprises:
   identifying individual defects common to two or more of sets of defects, wherein each of the sets of defects is produced by a different one of multiple scans of a wafer;
   acquiring two or more sampling parameter sets, one for each of the multiple scans such that each of the two or more sampling parameter sets corresponds to one of the sets of defects, wherein the two or more sampling parameter sets are selected independent of each other by a user, and wherein each of the two or more sampling parameter sets comprises one or more defect attributes;
   selecting defects from each of the sets of defects based on the two or more sampling parameter sets, wherein said selecting comprises:
      selecting, from each of the sets of defects, defects having the most diversity in the one or more defect attributes in the sampling parameter set corresponding to each of the sets of defects; and
      if the defects selected from a first of the sets of defects comprise one of the individual defects that is common to the first set of defects and at least a second of the sets of defects:
         selecting defects from the second set of defects that are diverse with respect to the one or more defect attributes, in the sampling parameter set corresponding to the second set of defects, of the one of the individual defects; and
         not selecting a defect in the second set of defects that is common with the one of the individual defects; and
   creating a defect sample for the wafer comprising the defects selected from each of the sets of defects.

20. A system configured to generate a defect sample for a wafer, comprising:
   an inspection subsystem configured to perform multiple scans of a wafer to produce sets of defects, each produced by a different one of the multiple scans; and
   a computer subsystem configured for:
      identifying individual defects common to two or more of the sets of defects;
      acquiring two or more sampling parameter sets, one for each of the multiple scans such that each of the two or more sampling parameter sets corresponds to one of the sets of defects, wherein the two or more sampling parameter sets are selected independent of each other by a user, and wherein each of the two or more sampling parameter sets comprises one or more defect attributes;
      selecting defects from each of the sets of defects based on the two or more sampling parameter sets, wherein said selecting comprises:
         selecting, from each of the sets of defects, defects having the most diversity in the one or more defect attributes in the sampling parameter set corresponding to each of the sets of defects; and
         if the defects selected from a first of the sets of defects comprise one of the individual defects that is common to the first set of defects and at least a second of the sets of defects:
            selecting defects from the second set of defects that are diverse with respect to the one or more defect attributes, in the sampling parameter set corresponding to the second set of defects, of the one of the individual defects; and
            not selecting a defect in the second set of defects that is common with the one of the individual defects; and
   creating a defect sample for the wafer comprising the defects selected from each of the sets of defects.

* * * * *